United States Patent [19]
Friedman

[11] Patent Number: 5,471,835
[45] Date of Patent: Dec. 5, 1995

[54] EXHAUST SYSTEM FOR INTERNAL COMBUSTION ENGINES

[76] Inventor: Harold E. Friedman, 8200 Ventura Canyon, Panorama City, Calif. 91402

[21] Appl. No.: 259,909

[22] Filed: Jun. 15, 1994

Related U.S. Application Data

[63] Continuation of Ser. No. 858,819, Apr. 1, 1992, abandoned, which is a continuation-in-part of Ser. No. 684,419, Apr. 12, 1991, abandoned.

[51] Int. Cl.$^6$ .................................................. F01N 3/30
[52] U.S. Cl. .............................. 60/293; 60/313; 60/323
[58] Field of Search .............................. 60/293, 313, 312, 60/274, 323

[56] References Cited

U.S. PATENT DOCUMENTS

| | | |
|---|---|---|
| 1,196,382 | 8/1916 | Moore ................................ 60/323 |
| 2,106,427 | 1/1938 | Hansson . |
| 2,370,259 | 2/1945 | Rippingille . |
| 2,649,083 | 8/1953 | Vogel et al. . |
| 2,717,583 | 9/1955 | Maybach et al. . |
| 2,841,951 | 7/1958 | Whitcomb . |
| 3,453,824 | 7/1969 | Biesecker . |
| 3,708,980 | 1/1973 | Truxell . |
| 3,716,992 | 2/1973 | Stahl ................................. 60/323 |
| 3,722,493 | 3/1973 | Hartmann et al. . |
| 3,726,084 | 4/1973 | Meier et al. . |
| 3,772,887 | 11/1973 | Ziegler . |
| 3,797,241 | 3/1974 | Kern . |
| 4,022,019 | 5/1977 | Garcea . |
| 4,069,666 | 1/1978 | Nakamura . |
| 4,133,175 | 1/1979 | Katoh ............................... 60/293 |
| 4,162,613 | 7/1979 | Tamura ............................ 60/278 |
| 4,182,121 | 1/1980 | Hall . |
| 4,192,846 | 3/1980 | Oya et al. . |
| 4,206,600 | 6/1980 | Feuling . |
| 4,207,738 | 6/1980 | Yoneda ............................ 60/278 |
| 4,240,254 | 12/1980 | Nakase ............................ 60/293 |
| 4,373,329 | 2/1983 | Martini . |
| 4,621,494 | 11/1986 | Fujita . |
| 4,800,720 | 1/1989 | Okada . |
| 4,815,274 | 3/1989 | Piatti . |
| 4,835,965 | 6/1989 | Poehlman . |
| 4,884,399 | 12/1989 | Morris . |
| 5,010,731 | 4/1991 | Onishi . |
| 5,050,378 | 9/1991 | Clemmens . |
| 5,216,883 | 6/1993 | Flugger ........................... 60/313 |

FOREIGN PATENT DOCUMENTS

| | | |
|---|---|---|
| 634616 | 1/1962 | Canada . |
| 697940 | 1/1931 | France . |
| 860897 | 1/1941 | France . |
| 1132431 | 3/1957 | France . |
| 2111806 | 11/1971 | Germany . |

OTHER PUBLICATIONS

The Power "Y" Header, Mid–Range Makes the Difference, from Speed & Custom Dealer, pp. 37–38, Feb. 1973.

*Primary Examiner*—Douglas Hart
*Attorney, Agent, or Firm*—Kelly, Bauersfeld & Lowry

[57] ABSTRACT

An exhaust control system having a plurality of exhaust manifolds is configured and arranged such that combustion of exhaust gases flowing therethrough is unhibited to the extent that the concentration of major pollutants (CO, HC, $NO_x$) exiting from the tail pipe and into the environment is substantially reduced. The exhaust system utilizes pairs of primary pipes defining an upstream portion of an exhaust manifold which are coupled to exhaust ports whose respective valves provide fluid flow communication to only one of the primary pipes at any moment in time. A secondary pipe defining an downstream portion of the exhaust manifold is coupled to the outlet of the primary pipes through a connector. One-way valves permit atmospheric air surrounding the exhaust manifold to be drawn into each primary pipe proximate its inlet, and into the secondary pipe proximate the connector.

25 Claims, 3 Drawing Sheets

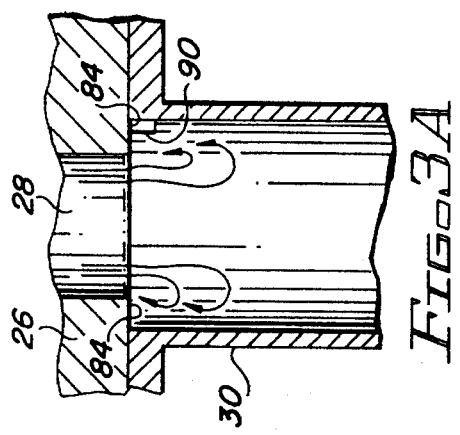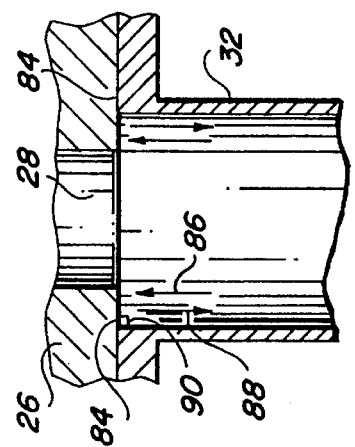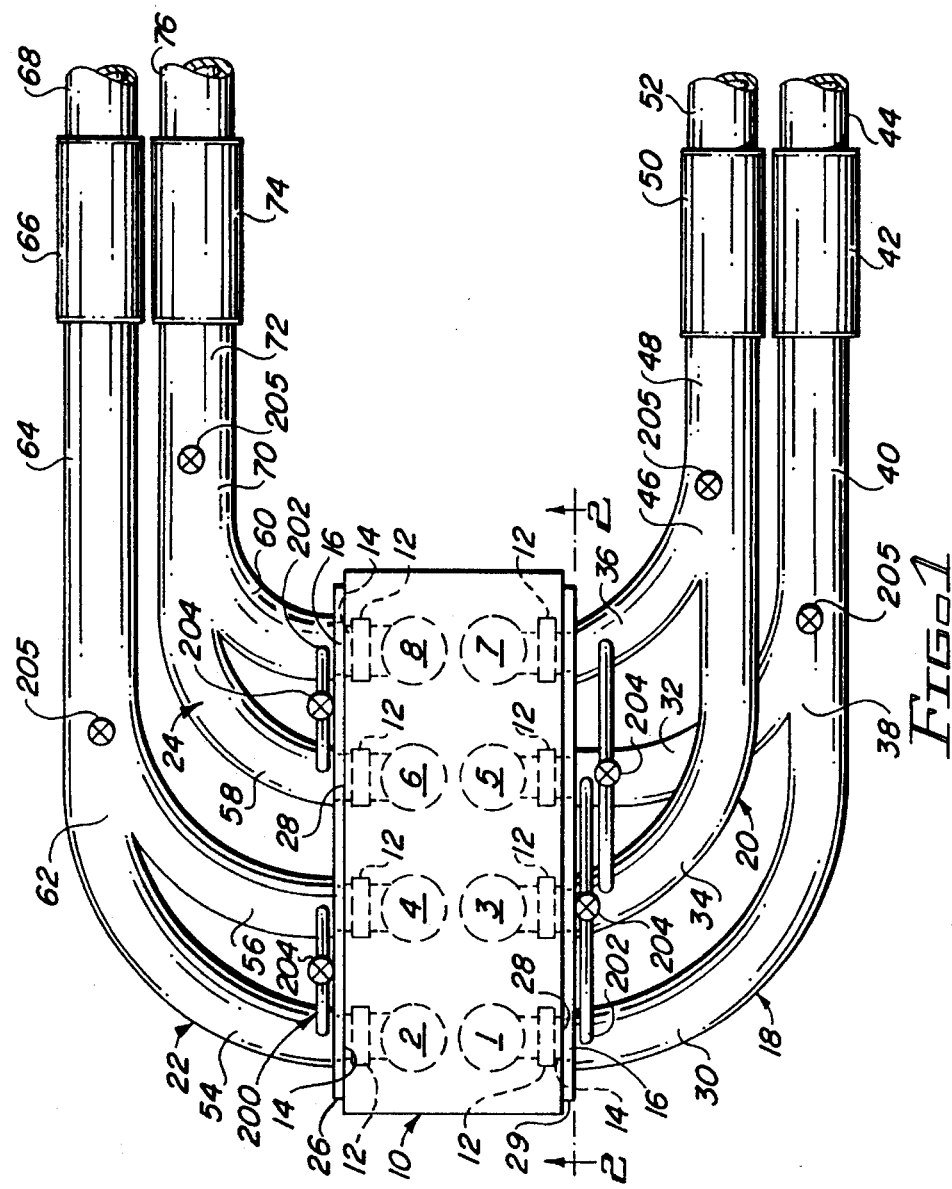

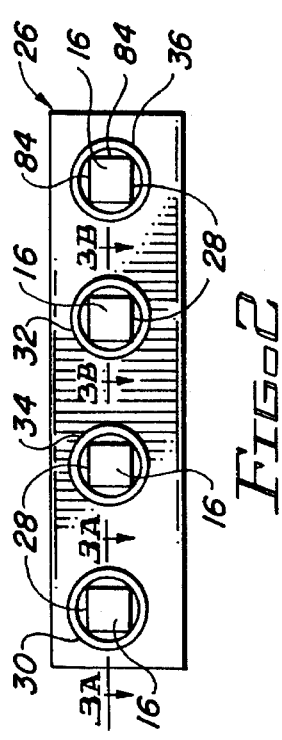
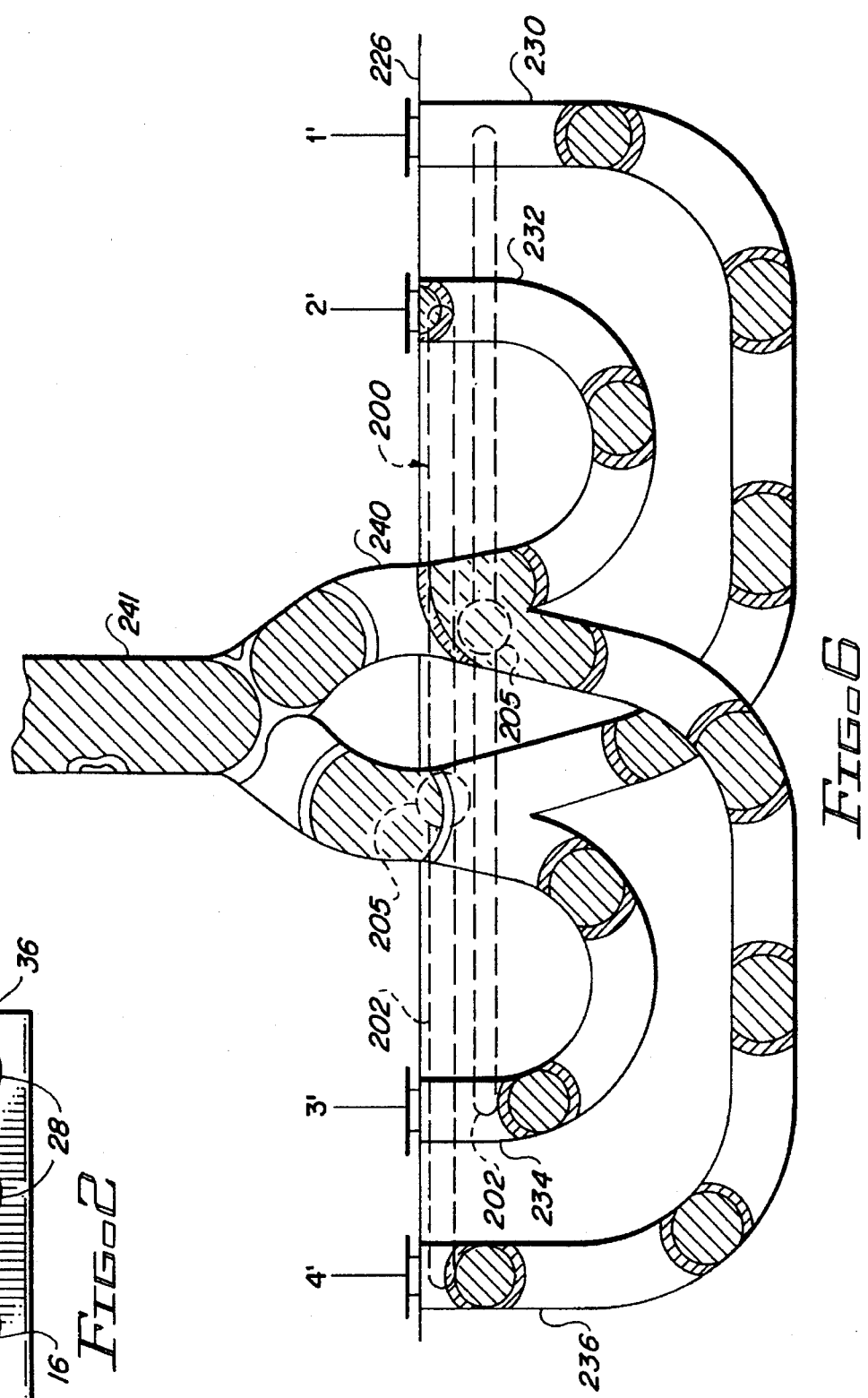

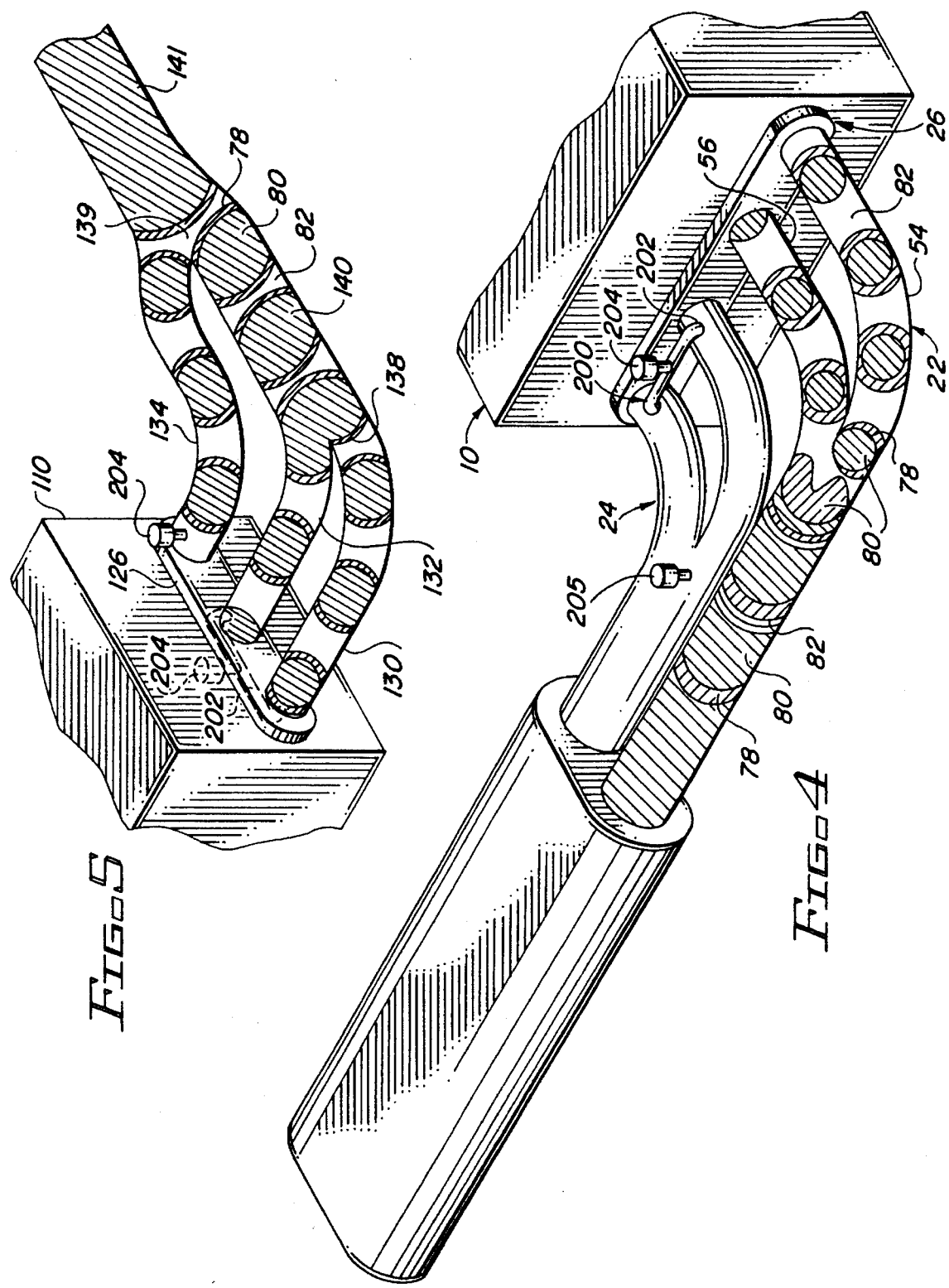

EXHAUST SYSTEM FOR INTERNAL COMBUSTION ENGINES

This application is a continuation of U.S. patent application Ser. No. 07/858,819, filed Apr. 1, 1992, which was a continuation-in-part of U.S. patent application Ser. No. 07/684,419, filed Apr. 12, 1991, both now abandoned.

BACKGROUND OF THE INVENTION

The present invention relates to internal combustion engines. More specifically, this invention relates to an exhaust system that improves the efficiency of an internal combustion engine and, thus, also reduces emissions therefrom.

Conventional internal combustion engines have proven to be the single most prevalent source of atmospheric pollution. To a very large degree, the pollution results from the need to maximize the power and performance of such engines, which leads to high compression ratios, which in turn result in incomplete combustion processes and the emission of large amounts of gaseous particulate pollutants. In an effort to remedy the emission pollution problems, complex valving arrangements and electronic control circuits have been added to the basic design of the engines. In some respects, emissions have been substantially reduced by such efforts. However, this reduction in emissions has resulted in a substantial increase in engine costs. Further, engine efficiencies have been reduced to an extent. These problems are essentially due to the use of certain environmental control devices, some of which are discussed below.

Heretofore, various combinations of devices have been used to reduce all three major exhaust gas pollutants, i.e., nitrogen oxides ($NO_x$), hydrocarbons (HC) and carbon monoxides (CO). Generally, exhaust gas recirculation systems (EGRs) have been used to reduce nitrogen oxides while after-treatment devices have been used to reduce hydrocarbons and carbon monoxides.

Exhaust gas recirculation systems generally require the carburetor of the engine to be set slightly richer than the stoichiometric airflow ratio for securing drivability and performance of after-treatment devices. Accordingly, certain operating efficiencies are reduced. Further, these complex devices increase initial engine costs as well as subsequent maintenance costs.

After-treatment devices include air pumps and catalytic converters. Air pumps are used to pump secondary air into the exhaust system in an attempt to improve combustion in the exhaust. However, it has been found that air pumps cause turbulent flow in the exhaust pipes which detracts from optimum combustion and clarification of exhaust gases. It is believed that one reason air pumps cause turbulent flow is that they operate continuously when the exhaust valves are open, as well as when they are closed. When an exhaust valve is open and exhaust discharged therethrough, air forced into the exhaust system by the air pump interferes with the downstream flow of the exhaust and creates turbulence. Turbulence also can be created by forcing secondary air into the exhaust system at excessive pressure. A further disadvantage of air pumps is that they reduce horsepower.

A catalytic converter is a reaction chamber typically containing a finely divided platinum-iridium catalyst into which exhaust gases from an automotive engine are passed, together with excess air, so that carbon monoxide and hydrocarbon pollutants are oxidized to carbon dioxide and water. Among the drawbacks of these catalytic converters is their adverse effect on power. For example, it is desirable to position the thermal reactor near the engine as much as possible to utilize the heat of exhaust gases before that heat gets out, and so usually it is directly connected to the exhaust port. This arrangement brings into effect a loss of desired exhaust gas stream characteristics which in turn causes a loss in power. Another disadvantage of catalytic converters is that sulphur is emitted from the exhaust system once the effective life of the converter has expired. The expiration of the life of the converter generally goes undetected, unless the automobile is subjected to an emissions inspection.

Another known after-treatment device incorporates heat insulators in the exhaust passage to maintain the high temperature exhaust gases at a temperature level whereby combustible contaminants are oxidized without entailing any power loss due to adverse effects on the exhaust gas stream as in the case of using thermal reactors. However, secondary air still is generally needed to provide the requisite oxygen for combustion in the exhaust system. This usually entails the use of pumps and accompanying apparatus that not only increase the cost of the automobile, but are subject to maintenance and repair, and possibly replacement, as well as the problems discussed above.

Accordingly, there has been a need for a novel exhaust system that avoids the problems and disadvantages of the prior art. Such an exhaust system should provide that combustion of exhaust gases flowing therethrough is uninhibited and combustion of unburned gases occurs to the extent that the concentration of harmful emissions exiting from the tail pipe(s) is substantially reduced. Moreover, such a system is needed which may be easily adapted to standard internal combustion engines, requiring little or no modification to the engine itself, other than in connection with the treatment of exhaust gases. The present invention fulfills these needs and provides other related advantages.

SUMMARY OF THE INVENTION

The present invention resides in an improved exhaust system for an internal combustion engine, which system is adaptable to virtually all types of multi-cylinder engines in an economical and efficient manner. The exhaust system comprises, generally, a plurality of primary pipes which define an upstream portion of an exhaust manifold, and a secondary pipe which defines a downstream portion of the exhaust manifold. Each primary pipe has an inlet and an outlet, and the inlets are coupled to exhaust ports associated with a plurality of cylinders whose respective valves provide fluid flow communication to only one of the primary pipes at any moment in time. The secondary pipe has inlet coupled to the outlets of the primary pipes through a connector. The secondary pipe inlet has a transverse sectional area at least equivalent to the sum of the transverse sectional areas of the primary pipe outlets.

In a preferred form of the invention, a pair of primary pipes define the upstream portion of the exhaust manifold. Each primary pipe has an inlet and an outlet, wherein the inlets are coupled to the exhaust ports associated with two cylinders of the internal combustion engine that are in line and farthest apart from each other in firing order with respect to the cylinders in that line. The transverse sectional area of each pipe inlet is greater than the transverse sectional area of the respective exhaust port to which the primary pipe is coupled. Further, each primary pipe is configured such that any transverse sectional area along the length thereof is at least equivalent to or greater than an upstream transverse sectional area thereof. Each primary pipe has a length of at least about sixteen inches.

A fresh air passageway is provided through each primary pipe adjacent to the primary pipe inlet. One-way valve means permit atmospheric air surrounding the exhaust manifold to be drawn into each primary pipe through the fresh air passageways. A conduit connects the fresh air passageways for the primary pipe pair, and the one-way valve means includes a one-way valve which permits atmospheric air surrounding the exhaust manifold to be drawn into the conduit.

The secondary pipe which defines the downstream portion of the exhaust manifold has an inlet coupled to the outlets of the primary pipes through a connector. The secondary pipe is configured such that any transverse sectional area along the length thereof is at least equivalent to or greater than an upstream transverse sectional area thereof.

Means are provided for introducing air through the secondary pipe and into the downstream portion of the exhaust manifold. This air introducing means includes a one-way valve coupled to the secondary pipe proximate the connector. Further, means are provided for reflecting exhaust reversals within the exhaust system such that an upstream exhaust pulse in the primary pipes in response to low pressure conditions upstream is directed downstream.

Other embodiments of the invention include a tertiary pipe having an inlet coupled to an outlet of the secondary pipe and an outlet of another conduit for exhaust gases from the internal combustion engine. The tertiary pipe inlet has a transverse sectional area at least equivalent to the sum of the transverse sectional areas of the secondary pipe outlet and the outlet of the other exhaust gas conduit. More particularly, in one additional embodiment the other exhaust gas conduit comprises a third primary pipe defining an upstream portion of the exhaust manifold. The third primary pipe has an inlet coupled to an exhaust port associated with a third cylinder. In another additional embodiment, the other exhaust gas conduit comprises another secondary pipe.

It has been found that the above-described embodiment provides an exhaust system that independently achieves a marked decrease in the concentration of CO, HC and $NO_x$ in the exhaust gases, while providing a reduction in fuel consumption and an increase in horsepower. The system eliminates the need for air pumps, catalytic converters and other devices designed to reduce harmful emissions from the exhaust gases of internal combustion engines.

The exhaust system, constructed in accordance with the above principles, is essentially maintenance-free. Further, it can be effectively used in conjunction with diesel as well as gasoline engines.

Other features and advantages of the present invention will become apparent from the following more detailed description, taken in conjunction with the accompanying drawings which illustrate, by way of example, the principles of the invention.

BRIEF DESCRIPTION OF THE DRAWINGS

FIG. 1 is a diagrammatic view of an exhaust system in accordance with the principles of the present invention;

FIG. 2 is a sectional view taken along line 2—2 of FIG. 1;

FIG. 3 illustrates exhaust flow in the region adjacent to two exhaust ports at a moment in time, wherein:

FIG. 3A is a sectional view taken along line 3A in FIG. 2; and

FIG. 3B is a sectional view taken along line 3B in FIG. 2;

FIG. 4 diagrammatically illustrates exhaust combustion within one of the manifolds illustrated in FIG. 1;

FIG. 5 diagrammatically illustrates the exhaust system of the invention adapted for use with a six-cylinder engine; and FIG. 6 diagrammatically illustrates the exhaust system of the present invention adapted for use with a diesel engine.

DETAILED DESCRIPTION OF THE PREFERRED EMBODIMENTS

Referring to the drawings in detail, wherein like numerals indicate like elements, the exhaust system is illustrated in accordance with the principles of the present invention.

Although the present invention can be employed on any suitable engine, it is illustrated in FIG. 1 in conjunction with a conventional V-8 engine having an engine block 10. Engine block 10 has a bank of four cylinders on each side. The cylinders in the right bank are numbered 1, 3, 5 and 7 (from front to rear) and those in the left bank are numbered 2, 4 6 and 8 (from front to rear). The cylinders may be charged with a combustible mixture as is conventional to those skilled in the art. The combustible charge is burned in the cylinders to form exhaust gases which are discharged therefrom through an exhaust system. The exhaust system includes exhaust valves 12 that open to permit exhaust gases to flow through exhaust passages 14 and out exhaust ports 16 as is conventional in the art.

Exhaust manifolds 18, 20 22 and 24 are coupled to exhaust ports 16 through bracket members or plates 26 which have holes 28 formed therethrough. Bracket holes 28 are aligned with exhaust ports 16 and have the same configuration and size as exhaust ports 16 to prevent turbulent flow therebetween ( FIGS. 1 and 2). Each exhaust manifold includes primary pipes that are coupled to a secondary pipe. Each secondary pipe is coupled to a muffler and a tail pipe.

Referring to FIG. 1, primary pipes 30, 32 of manifold 18 and primary pipes 34,36 of manifold 20 are coupled to one of brackets 26 such that the inlet of the primary pipes communicates with exhaust ports 16. Each primary pipe 30, 32, 34, 36 can be welded to a bracket 26 which can be secured to the block such as by bolt-type fasteners. With reference to the odd-numbered cylinders 1, 3, 5, and 7, the inlet passages of primary pipes 30 and 32 are coupled to the exhaust ports of cylinders 1 and 5. The other end of primary pipes 30 and 32 are joined at Y-connector 38 which is in turn coupled to an enlarged secondary pipe 40. Secondary pipe 40 is then coupled in a conventional manner to muffler 42 which is coupled to tail pipe 44. Similarly, the inlet passages of primary pipes 34 and 36 are coupled to the exhaust ports of cylinders 3 and 7. The other end of primary pipes 34 and 36 are joined at a Y-connector 46 which is coupled to an enlarged secondary pipe 48, muffler 50 and tail pipe 52.

On the other side of engine block 10, primary pipes 54, 56 of manifold 22 and primary pipes 58,60 of manifold 24 are coupled to the exhaust ports of cylinders 2, 4, 6 and 8. The inlet passages of primary pipes 54 and 56 are coupled to the exhaust ports of cylinders 2 and 4. The other ends of primary pipes 54 and 56 are coupled to Y-connector 62 which is coupled to a secondary pipe 64. Secondary pipe 64 is then coupled to muffler 66 and tail pipe 68. Similarly, the exhaust ports of cylinders 6 and 8 are coupled to primary pipes 58 and 60 which are coupled to Y-connector 70, secondary pipe 72, muffler 74 and tail pipe 76.

The inlet passages of the primary pipes are connected to the exhaust ports such that exhaust from one cylinder is dissipated before the other cylinder, connected to the same exhaust manifold, discharges exhaust, so that the exhaust streams from the primary pipes alternate in their entry into the secondary pipe. By way of example, FIG. 1 illustrates the preferred coupling sequence between the exhaust ports and primary pipes in a V-8 engine having a firing order of 1-8-4-3-6-5-7-2 wherein cylinders 1 and 5, and 3 and 7 are farthest apart in firing order on one side of the engine block 10, and 2 and 4, and 6 and 8 are farthest apart in the firing order on the other side of the block. Ideally, each primary pipe pair is coupled to two cylinders that are farthest apart from each other in firing order (to maximize the time interval between the exhaust discharge into one primary pipe and the exhaust discharge into the other primary pipe of the primary pipe pair), but the above configuration permits optimization of this concept, while avoiding routing primary pipes over, under or around the engine block. When cylinder 1 commences its exhaust stroke and its exhaust valve 12 opens, the exhaust valve 12 of cylinder 5 will be closed throughout the duration of the opening of the exhaust valve associated with cylinder 1. In this manner, primary pipe 32 has substantially no effect on the downstream flow of the exhaust gases being emitted from cylinder 1. By the time that cylinder 5 fires, the exhaust gases from cylinder 1 will have progressed substantially down secondary pipe 40 toward tail pipe 44. When cylinder 5 does fire, the hot exhaust gases and flames emitted therefrom likewise will not be affected by pressure in primary pipe 30, which is coupled to cylinder 1. Accordingly, these hot exhaust gases and flames will be effective in continuing the burning of those yet unburned fuel components previously exhausted from cylinder 1 as the exhaust from cylinder 5 enters secondary pipe 40 immediately behind the exhaust from cylinder 1. Referring to FIG. 4, this timed alternating sequence is diagrammatically shown with respect to cylinders 2 and 4 of the engine shown in FIG. 1, wherein burning gases, burned gases, and unburned gases are designated with reference numerals 78, 80 and 82, respectively. As evident from FIG. 4, the leading flame front of burning gases 78 that enters secondary pipe 64 from primary pipe 56 immediately after an exhaust discharge from primary pipe 54 has entered secondary pipe 64, promotes combustion of the preceding exhaust discharge as the leading frame front comes into position behind the preceding exhaust discharge from primary pipe 54 due to the alternating timed flow into the secondary pipe. In addition, this alternating sequence in which the exhaust gases from the primary pipes enter the secondary pipe of a primary pipe pair minimizes pressure build-up and turbulence that can, for example, smother the burning gases. It also should be noted that although one muffler is illustrated as being coupled to two manifolds in FIG. 4, the muffler should have a flow volume equivalent to the sum of the primary pipes associated therewith.

Returning to FIG. 2, the transverse sectional area of each inlet passage, defined by the inner wall of the upstream end of a respective primary pipe, is greater than the transverse sectional area of the exhaust port, and thus the bracket hole associated therewith. Further, referring to FIGS. 3A and 3B, it should be noted that the transition between these areas (i.e., the transition between the geometrical configurations of bracket holes 28 and the inlet portions of the primary pipes) is abrupt. Although this abrupt transition creates turbulence at the inlet portions of the primary pipes (FIG. 3A), the disadvantages of the turbulence are outweighed by the stabilizing effect that this configuration has on the downstream inertia of the gas as discussed below.

The inside diameter of each primary pipe is greater than the diagonally measured dimension of similarly dimensioned exhaust ports 16 and bracket holes 28. A portion of one of bracket plates 26 is enclosed in each primary pipe, thereby forming walls 84 that extend radially inwardly relative to the inlet portion of a respective primary pipe. Walls 84 redirect exhaust gas in accordance with pressure states in the primary pipes. Specifically, when an exhaust valve suddenly closes, a vacuum-like condition develops on the downstream side of the valve. In response to the pressure differential developed by this vacuum and the pressure drop created by the evacuation of the high velocity exhaust stream, exhaust gas reverses in direction and there is a pulse toward the engine block as designated by reference numeral 86. This results in pulsating downstream flow. It has been found that the time interval for reverse exhaust travel and, thus the degree of exhaust pulsation is greatly reduced by minimizing the time period in which the exhaust flows in the reverse direction. Accordingly, reflecting walls 84 are provided to reflect these upstream pulses and redirect them in the downstream direction as designated by reference numeral 88. Walls 84 are oriented such that their reflecting surfaces are substantially normal to the inner walls at the inlet end of the primary pipes as designated with reference numeral 90 (FIGS. 3A and 3B).

With this construction, walls 84 minimize any decrease in the downstream inertia of the exhaust gases. In other words, walls 84 prevent exhaust gases from returning to the exhaust valves such that the degree of exhaust pulsation or extent of exhaust gas oscillation is reduced. Thus, any turbulence generated by such exhaust pulsation is minimized. Walls 84 are positioned about one to two inches downstream from the exhaust valves to achieve optimum results. Obviously, brackets 26 can be dimensioned to ensure this spacing requirement. Walls 84 also extend radially inwardly about ⅛ to ¼ inch. Below this range, insufficient reflecting surface is provided. Above this range, an excessive amount of the turbulence illustrated in FIG. 3A results. Therefore, although the configuration of the primary pipes can be altered in accordance with varying exhaust port configurations, a reflecting surface should be provided in accordance with the above-described principles and dimensions. Accordingly, it should be understood that, in the alternative, for example, the bracket holes can be sized to have a greater diagonal dimension than exhaust ports 16 to form reflecting walls (corresponding to reflecting walls 84) on the sides of engine block 10. In this arrangement, the inlet portion of the primary pipes would substantially correspond in size and configuration to the bracket holes. Although ports 16 and holes 28 are shown as being rectangular in FIG. 2, other configurations can be used without departing from the scope of the invention.

A one-way valve arrangement is also provided that permits the entry of air at atmospheric pressure into the primary pipes in the vicinity of the exhaust ports in response to low pressure conditions in that vicinity. This air introduction counters the effects of the vacuum created by the valve closing and the vacuum-like condition or low pressure area that develops behind the exhaust stream due to the evacuation of the exhaust at high velocity. The latter phenomena is similar to that which exists when evacuating a fluid from a tube, and especially in a closed end tube wherein the fluid is being evacuated away from the closed end. The secondary air delivered by the one-way valve thus minimizes back pressure which causes pulsation so that the exhaust can flow in a continuous pattern down the exhaust pipe.

Referring to FIG. 1, the above valve arrangement includes valve devices generally designated with reference numeral

200. Each valve device 200 includes interconnecting pipe 202 and one-way valve 204 which is coupled to the interconnecting pipe 202 to provide one-way flow into pipe 202 when the pressure therein falls below a predetermined value such as atmospheric pressure. Each interconnecting pipe member or conduit 202 interconnects a primary pipe pair (30 and 32; 34 and 36; 54 and 56; and 58 and 60) such that the one-way valve responds to pressure fluctuation in the primary pipe pair associated therewith. It should be noted the location where this secondary air is introduced into the exhaust system should be as close as possible to the exhaust valve to minimize interference with the downstream flow of the exhaust gases. Although a one-way valve may be coupled to each primary pipe in the vicinity immediately adjacent the exhaust port, the above configuration provides adequate results with economy for an eight-cylinder engine. That is, it has been found that, when it is impractical to provide each primary pipe with an individual one-way valve, it is preferred to couple each one-way valve with a primary pipe pair. Since each primary pipe pair is coupled to cylinders spaced farthest apart in firing order as possible with respect to the cylinders in the same bank of cylinders, the time interval between exhaust discharge into the primary pipe pair is maximized to effectuate efficient draw of air into a respective primary pipe. In the diesel engine illustrated in FIG. 6, one valve device 200 preferably interconnects each primary pipe pair (230 and 234; 232 and 236) for the reasons provided above. However, in the six-cylinder engine illustrated in FIG. 5 one valve device 200 preferably couples primary pipes 130 and 132, which are coupled to cylinders furthest apart in firing order with respect to the side of engine block 110 illustrated in FIG. 5, while a separate valve 204 is individually coupled to remaining primary pipe 134.

Returning to FIG. 1, individual one-way valves 205 are coupled to the upstream portion of each secondary pipe 40, 48, 64 and 72, for example, to compensate for low pressure areas which develop as a result of exhaust gas cooling in the secondary pipe. In other words, the one-way valves 205 provide means for introducing air into the secondary pipes 40, 48, 64 and 72, proximate the respective Y-connectors 38, 46, 62 and 70.

The one-way valves 204 and 205 may be selected from a wide variety of valves, as would be apparent to one skilled in the art. One suitable valve is Model No. AV9 check valve, manufactured by the Standard Motor Products, Inc., Long Island City, N.Y. In addition, it has been found that the inner diameter of connecting pipe 202 preferably is about 5/16 to 1/2 inch to provide sufficient air to the exhaust pipes. To minimize the noise generated through the one-way valve, the valve can be provided with a glass pack or equivalent type muffler. For example, a rubber hose can be connected to the inlet of the one-way valve and steel wool packed in the hose to reduce noise.

The length of the primary pipes from a respective bracket member to the Y-connector associated therewith is preferably approximately 16 to 18 inches or more. This limitation is independent of pipe diameter and is sometimes necessary to prevent back blow exhaust gas flowing from one primary pipe to the other of a primary pipe pair. Such back blow interferes with the downstream flow of the exhaust gases in the primary pipe in which the back blow occurs. Accordingly, it disturbs the alternating sequence and the timing in which the exhaust gases enter the secondary pipe (discussed above), which results in incomplete combustion and emission of higher concentrations of pollutants. Back blow also generates turbulence that can result in flame blowout. Usually, however, back blow is not a problem when the one-way valves 204 are utilized.

Turbulence also is minimized throughout the exhaust system by utilizing pipes of slightly increasing inside diameters, to reduce the development of back pressure. From each Y-connector, the internal diameter of the secondary pipe increases such that the flow volume of the secondary pipe is at least as large as the sum of the flow volumes of the primary pipes coupled thereto. In this way, more than one cylinder can discharge exhaust gases into the same manifold without a material increase in the exhaust back pressure. Further, as the controlled exhaust gases reach the larger diameter secondary pipes, the gases are introduced to more air and oxygen. These gases then continue to burn, rather than being smothered. As an example, for a 302 cubic inch V8 engine, such as the one used with the Nova made by Chevrolet, the primary pipes may be chosen having an inside diameter of about 1 5/8 inches whereas the secondary pipes may have an inside diameter of about 2 1/2 inches.

Referring to FIG. 5, the exhaust system in accordance with the principles of the present invention is shown in connection with an engine block for a six-cylinder engine designated with reference numeral 110. This system differs from the preferred arrangement illustrated in FIG. 1, in that three cylinders are coupled to a single manifold. This configuration reduces certain material costs, without unduly sacrificing pollution control efficiencies. Specifically, primary pipes 130 and 132 are coupled to cylinders that are positioned farthest apart in firing order, while primary pipe 134 is coupled to a cylinder that is positioned closest in firing order to one of the former cylinders. The latter interconnection increases back pressure and turbulence to some degree. Primary pipes 130 and 132 extend from mounting bracket 126 and communicate with secondary pipe 140 through Y-connection 138. Primary pipe 134 and secondary pipe 140 are joined at Y-connection 139 to communicate with tertiary pipe 141. Primary pipes 130 and 132 preferably have a length of at least 16 inches, while primary pipe 134 has a length of about at least 18 inches to prevent back blow into pipe 134 from pipes 130 and 132.

Referring to FIG. 6, the present invention is shown in conjunction with a diesel engine. This configuration differs from the preferred embodiment in that four cylinders eventually communicate with a single exhaust pipe 241. Primary pipes 230, 232, 234 and 236 are coupled to cylinders 1', 2', 3' and 4', respectively, through mounting plate 226. The cylinders are shown diagrammatically and have a firing order of 1', 3', 4' and 2'. Each primary pipe preferably has a length of at least 16 inches.

The use of an exhaust system of the type described herein for an eight cylinder engine has been found to provide markedly reduced emissions. Preferably, that system utilizes four mufflers and four tail pipes to further minimize or eliminate any exhaust gas pulsations. In more than one instance, vehicles have been tested with this system and have been able to provide an engine which surpasses the rather severe maximum emission standards currently in effect for the State of California without the use of any other exhaust emission control devices. There have been marked reductions in the emission of hydrocarbons, carbon monoxide and nitrogen oxides.

However, it should be understood that the principles disclosed above are applicable to all internal combustion engines, diesel or gas, of four or more cylinders, and equally applicable to engines having a different firing order.

Although several embodiments of the invention have been described in detail for purposes of illustration, various modifications may be made without departing from the spirit and scope of the invention. Accordingly, the invention is not to be limited, except as by the appended claims.

What is claimed is:

1. An exhaust system for an internal combustion engine having a plurality of cylinders, an exhaust port associated with each cylinder, and an exhaust valve associated with each exhaust port, the exhaust system comprising:

a plurality of primary pipes attached to a head for the internal combustion engine and defining an upstream portion of an exhaust manifold, each primary pipe having an inlet and an outlet, wherein the inlets are coupled to the exhaust ports associated with a plurality of cylinders whose respective valves provide fluid flow communication to only one of the primary pipes at any moment in time, and wherein each primary pipe is configured such that any transverse sectional area along the length thereof is at least equivalent to or greater than an upstream transverse sectional area thereof;

a secondary pipe defining a downstream portion of the exhaust manifold and having an inlet coupled to the outlets of the primary pipes through a connector, wherein the secondary pipe inlet has a transverse sectional area at least equivalent to the sum of the transverse sectional areas of the primary pipe outlets, and wherein the secondary pipe is configured such that any transverse sectional area along the length thereof is at least equivalent to or greater than an upstream transverse sectional area thereof;

a fresh air passageway through each primary pipe adjacent to the primary pipe inlet; and one-way valve means for permitting atmospheric air surrounding the exhaust manifold to be drawn into each primary pipe through the fresh air passageways.

2. The exhaust system of claim 1, wherein the transverse sectional area of each primary pipe inlet is greater than the transverse sectional area of the respective exhaust port to which the primary pipe is coupled.

3. The exhaust system of claim 2, wherein each primary pipe has a length of at least about 16 inches.

4. The exhaust system of claim 1, wherein the one-way valve means includes a conduit connecting the fresh air passageways for a pair of primary pipes.

5. The exhaust system of claim 4, wherein the one-way valve means includes a one-way valve for permitting atmospheric air surrounding the exhaust manifold to be drawn into the conduit.

6. The exhaust system of claim 1, including means for introducing air through the secondary pipe and into the downstream portion of the exhaust manifold.

7. The exhaust system of claim 6, wherein the air introducing means includes a one-way valve coupled to the secondary pipe.

8. The exhaust system of claim 7, wherein the one-way valve of the air introducing means is situated proximate the connector.

9. An exhaust system for an internal combustion engine having a plurality of cylinders and an exhaust port associated with each cylinder, the exhaust system comprising:

a pair of primary pipes defining an upstream portion of an exhaust manifold, each primary pipe having an inlet and an outlet, wherein the inlets are coupled to the exhaust ports associated with two cylinders that are in line and farthest apart from each other in firing order with respect to the cylinders in that line, the transverse sectional area of each primary pipe inlet being greater than the transverse sectional area of the respective exhaust port to which the primary pipe is coupled, and wherein each primary pipe is configured such that any transverse sectional area along the length thereof is at least equivalent to or greater than an upstream transverse sectional area thereof;

a fresh air passageway through each primary pipe adjacent to the primary pipe inlet;

one-way valve means for permitting atmospheric air surrounding the exhaust manifold to be drawn into each primary pipe through the fresh air passageways, the one-way valve means including a conduit connecting the fresh air passageways for the primary pipe pair; and a secondary pipe defining a downstream portion of the exhaust manifold and having an inlet coupled to the outlets of the primary pipes through a connector, wherein the secondary pipe inlet has a transverse sectional area at least equivalent to the sum of the transverse sectional areas of the primary pipe outlets, and wherein the secondary pipe is configured such that any transverse sectional area along the length thereof is at least equivalent to or greater than an upstream transverse sectional area thereof.

10. The exhaust system of claim 9, wherein the one-way valve means includes a one-way valve for permitting atmospheric air surrounding the exhaust manifold to be drawn into the conduit.

11. The exhaust system of claim 9, including means for introducing air through the secondary pipe and into the downstream portion of the exhaust manifold, the air introducing means including a one-way valve coupled to the secondary pipe proximate the connector.

12. The exhaust system of claim 9, including a tertiary pipe having an inlet coupled to an outlet of the secondary pipe and an outlet of another conduit for exhaust gases from the internal combustion engine, wherein the tertiary pipe inlet has a transverse sectional area at least equivalent to the sum of the transverse sectional areas of the secondary pipe outlet and the outlet of the other exhaust gas conduit.

13. The exhaust system of claim 12, wherein the other exhaust gas conduit comprises a third primary pipe defining an upstream portion of the exhaust manifold, the third primary pipe having an inlet coupled to an exhaust port associated with a third cylinder.

14. The exhaust system of claim 12, wherein the other exhaust gas conduit comprises another secondary pipe.

15. An exhaust system for an internal combustion engine having a plurality of cylinders and an exhaust port associated with each cylinder, the exhaust system comprising:

a pair of primary pipes defining an upstream portion of an exhaust manifold, each primary pipe having an inlet and an outlet, wherein the inlets are coupled to the exhaust ports associated with two cylinders that are in line and farthest apart from each other in firing order with respect to the cylinders in that line, the transverse sectional area of each primary pipe inlet being greater than the transverse sectional area of the respective exhaust port to which the primary pipe is coupled, and wherein each primary pipe is configured such that any transverse sectional area along the length thereof is at least equivalent to or greater than an upstream transverse sectional area thereof;

a secondary pipe defining a downstream portion of the exhaust manifold and having an inlet coupled to the outlets of the primary pipes through a connector, wherein the secondary pipe inlet has a transverse sectional area at least equivalent to the sum of the transverse sectional areas of the primary pipe outlets, and wherein the secondary pipe is configured such that any transverse sectional area along the length thereof is at least equivalent to or greater than an upstream transverse sectional area thereof; and means for introducing air through the secondary pipe and into the downstream portion of the exhaust manifold.

16. The exhaust system of claim 15, wherein the air introducing means includes a one-way valve coupled to the secondary pipe.

17. The exhaust system of claim 16, wherein the one-way valve of the air introducing means is situated proximate the connector.

18. The exhaust system of claim 15, including a fresh air passageway through each primary pipe adjacent to the primary pipe inlet, and one-way valve means for permitting atmospheric air surrounding the exhaust manifold to be drawn into each primary pipe through the fresh air passageways.

19. The exhaust system of claim 18, wherein the one-way valve means includes a conduit connecting the fresh air passageways, wherein the one-way valve means includes a one-way valve for permitting atmospheric air surrounding the exhaust manifold to be drawn into the conduit.

20. An exhaust system for an internal combustion engine having a plurality of cylinders, an exhaust port associated with each cylinder, and an exhaust valve associated with each exhaust port, the exhaust system comprising:

a plurality of primary pipes attached to a head for the internal combustion engine and defining an upstream portion of an exhaust manifold, each primary pipe having an inlet and an outlet, wherein the inlets are coupled to the exhaust ports associated with a plurality of cylinders whose respective valves provide fluid flow communication to only one of the primary pipes at any moment in time, wherein each primary pipe is configured such that any transverse sectional area along the length thereof is at least equivalent to or greater than an upstream transverse sectional area thereof;

a secondary pipe defining a downstream portion of the exhaust manifold and having an inlet coupled to the outlets of the primary pipes through a connector, wherein the secondary pipe inlet has a transverse sectional area at least equivalent to the sum of the transverse sectional areas of the primary pipe outlets, and wherein the secondary pipe is configured such that any transverse sectional area along the length thereof is at least equivalent to or greater than an upstream transverse sectional area thereof; and a reflecting wall extending radially inwardly relative to the inlet of each primary pipe.

21. The exhaust system of claim 20, wherein the transverse sectional area of each primary pipe inlet is greater than the transverse sectional area of the respective exhaust port to which the primary pipe is coupled.

22. The exhaust system of claim 21, including a fresh air passageway through each primary pipe adjacent to the primary pipe inlet, and one-way valve means for permitting atmospheric air surrounding the exhaust manifold to be drawn into each primary pipe through the fresh air passageways.

23. The exhaust system of claim 22, wherein the one-way valve means includes a conduit connecting the fresh air passageways, wherein the one-way valve means includes a one-way valve for permitting atmospheric air surrounding the exhaust manifold to be drawn into the conduit.

24. The exhaust system of claim 23, including means for introducing air through the secondary pipe and into the downstream portion of the exhaust manifold, wherein the air introducing means includes a one-way valve coupled to the secondary pipe.

25. The exhaust system of claim 24, wherein the one-way valve of the air introducing means is situated proximate the connector.

* * * * *